United States Patent
Wu et al.

(10) Patent No.: US 6,183,799 B1
(45) Date of Patent: Feb. 6, 2001

(54) EXTRUSION PROCESS FOR LAMINATED CANDY PRODUCTS

(75) Inventors: William Wu, Dublin; Henry Archibald, Marysville, both of OH (US)

(73) Assignee: Nestec S.A., Vevey (CH)

( * ) Notice: Under 35 U.S.C. 154(b), the term of this patent shall be extended for 0 days.

(21) Appl. No.: 09/320,567

(22) Filed: May 27, 1999

(51) Int. Cl.[7] .............................. A23G 3/00; A23G 3/06; A23G 3/20

(52) U.S. Cl. ..................... 426/516; 426/660; 99/450.1; 99/450.2; 99/450.7

(58) Field of Search .................................. 426/516, 660; 425/375; 99/450.1, 450.2, 450.3, 450.4, 450.5, 450.6, 450.7, 450.8, 451

(56) References Cited

U.S. PATENT DOCUMENTS

| | | | |
|---|---|---|---|
| 1,566,329 | * | 12/1925 | Laskey . |
| 1,951,694 | * | 3/1934 | Goulstone . |
| 2,478,075 | * | 8/1949 | Baker . |
| 2,742,000 | * | 4/1956 | Hansen et al. . |
| 3,213,808 | * | 10/1965 | Schafer . |
| 3,554,137 | * | 1/1971 | Carre et al. . |
| 3,821,452 | * | 6/1974 | Hayashi . |
| 3,851,084 | * | 11/1974 | Rossen et al. . |
| 3,940,226 | * | 2/1976 | Verhoeven . |
| 4,054,271 | * | 10/1977 | Lanzillo . |
| 4,113,819 | * | 9/1978 | Hayashi et al. . |
| 4,279,932 | * | 7/1981 | Koshida et al. . |
| 4,305,965 | * | 12/1981 | Cheney . |
| 4,357,359 | * | 11/1982 | Cloud et al. . |
| 4,449,906 | * | 5/1984 | Sienkiewicz et al. . |
| 4,536,147 | * | 8/1985 | Groff . |
| 4,542,028 | * | 9/1985 | Butcher et al. . |
| 4,563,358 | * | 1/1986 | Mercer et al. . |
| 4,647,467 | * | 3/1987 | Pinto . |
| 4,648,316 | * | 3/1987 | Ruffinatti . |
| 4,679,496 | | 7/1987 | Simelunas et al. ..................... 99/450 |
| 4,715,803 | * | 12/1987 | Koppa . |
| 4,732,770 | * | 3/1988 | Welygan et al. . |
| 4,793,786 | * | 12/1988 | Greenhouse et al. . |
| 4,821,634 | * | 4/1989 | Swanson . |
| 4,847,090 | * | 7/1989 | Della Posta et al. . |
| 4,851,247 | | 7/1989 | Greenhouse et al. ................. 426/250 |
| 4,878,425 | * | 11/1989 | Butcher et al. . |
| 4,894,002 | * | 1/1990 | Groff . |
| 4,913,645 | * | 4/1990 | Daouse et al. . |
| 4,923,706 | * | 5/1990 | Binley et al. . |
| 4,932,317 | * | 6/1990 | Hoormann . |
| 4,949,630 | | 8/1990 | Knebl ..................................... 99/450 |
| 5,000,969 | | 3/1991 | Beer ...................................... 426/101 |
| 5,035,905 | * | 7/1991 | Knebl . |
| 5,073,389 | | 12/1991 | Weinecke .............................. 426/103 |
| 5,126,157 | | 6/1992 | Burwell et al. ....................... 426/515 |
| 5,437,879 | * | 8/1995 | Kabse et al. . |
| 5,686,128 | * | 11/1997 | Tracy et al. . |
| 5,723,164 | * | 3/1998 | Morano . |
| 6,054,166 | * | 4/2000 | Dupart . |

FOREIGN PATENT DOCUMENTS 0 570 313 A1    5/1993    (EP) .

* cited by examiner

*Primary Examiner*—Cynthia L. Nessler
(74) *Attorney, Agent, or Firm*—Pennie & Edmonds LLP

(57) ABSTRACT

The invention relates to a method and apparatus for producing a laminated edible product such as a candy product. This method includes the steps of extruding from the exit port of a coaxial die a thin strip of a first fluid material encased in a layer of a second fluid material, depositing the thin strip on a support, and superimposing additional thin strip on top of the first thin strip. The invention also relates to an edible product prepared by this method.

18 Claims, 5 Drawing Sheets

EXTRUSION PROCESS FOR LAMINATED CANDY PRODUCTS

TECHNICAL FIELD

The present invention relates to the production of candy products having a laminated structure with a desired texture.

BACKGROUND ART

Laminated candy products consist of layers of hard candy and a fatty paste or fluid such as peanut butter which is typically coated with chocolate or another coating. The conventional process for producing a laminated candy product involves heating candy syrup in a precooker to form a candy mass and boiling the resulting candy mass to produce a viscous material having a low moisture content. Typically the moisture content is about 4–5%. The resulting boiled candy mass is discharged from the cooker and passed through an aeration screw to aerate the candy mass. The aerated candy mass is then placed on a steel tempering band which cools the candy mass to a specified temperature such that the candy mass remains pliable. The aerated candy mass is then sheeted and the candy sheet is coated with a layer of fatty paste. The layer of fatty paste and aerated candy may be sprinkled with rework prepared from reusable products from previous candy bar forming operations. The layer of candy mass and fatty paste is then rolled onto itself to give a thicker candy mass with more layers. The resulting rolled product is then passed to a rope forming machine where an outer layer of boiled candy mass is applied. The plastic mass is then formed into a continuous rope and then formed and cut into individual bars. The whole system is continuous. The resulting candy bar centers can be coated with chocolate or other coatings to produce the final candy product. An example of this process is disclosed in U.S. Pat. No. 4,679,496.

The texture of the candy product is a result of the laminated structure. For example, a candy product with a laminated structure generally has a crunchy texture. It is desirable to produce a laminated structure that has consistent texture throughout the product. The conventional process for manufacturing laminated candy products, however, does not always provide this consistency. For example, the conventional process often leads to areas with large masses of hard candy that do not have a crunchy texture but instead are more like a solid candy mass. Thus, there is a need for a process for making laminated candy products that produces a product with a more consistent texture. The present invention provides such a process.

SUMMARY OF THE INVENTION

The present invention relates to a process and apparatus for the production of candy products having a laminated structure. The invention also relates to a laminated edible product prepared according to the process.

The method according to the present invention produces a laminated edible product having thin layers of at least one fluid first material interleaved between thin layers of a second fluid material. The method involves extruding from the exit port of a coaxial die a thin strip of at least one first fluid material encased in a layer of a second fluid material, wherein the at least one first fluid material and the second fluid material are not miscible; depositing said thin strip on a support; and superimposing a second thin strip on the first thin strip. Additional thin strips may then be superimposed on the first or second thin strips.

According to this method, the thin strips may be superimposed on top of one another by a variety of means. The thin strips may be superimposed on top of one another by oscillating the support under the coaxial die. In another embodiment, the thin strips are superimposed by oscillating the coaxial die above the support. In a preferred embodiment the coaxial die is oscillated in both a first direction and a second direction, with the second direction being perpendicular to the first direction. The support may be a conveyor belt that moves in the first direction. In yet another embodiment the support is a conveyor belt and the layers are superimposed by moving the conveyor belt in a first direction and oscillating the coaxial die above the conveyor belt in a second perpendicular direction. In yet another embodiment the layers are superimposed by oscillating the coaxial die in a first direction and oscillating the support in a second direction, which is perpendicular to the direction of oscillation of the coaxial die.

The thickness of the thin strips extruded from the exit port of the coaxial die are from about $\frac{1}{100}$ inch to $\frac{1}{8}$ inch and preferably are from about $\frac{1}{10}$ inch to $\frac{1}{25}$ inch. The number of thin strips that are superimposed is from about 2 to 500 and preferably is from about 10 to 50. The superimposed thin strips have a thickness from about 0.01 inches to 4 inches, preferably from about 0.375 inches to 1 inch. The superimposed thin strips may be further thinned by rolling the stack of superimposed thin strips to form the product.

The thin strip of at least one first fluid material can be a multi-layered thin strip of first fluid materials. The thin strip of at least one first fluid material can also be a single layer of more than one first fluid materials wherein each of the first fluid materials are adjacent to each other.

In one embodiment the at least one first fluid material is a fatty paste or fluid and the second fluid material is a candy mass. In another embodiment the fatty paste or fluid is peanut butter. The method of the present invention can thus be used to prepare edible products.

The invention also relates to an apparatus for making laminated edible products which includes a support which is capable of movement; a coaxial die assembly for depositing one or more layers of fluid material on to the support; a die holder which supports the coaxial die assembly and is positioned above the support; a first drive assembly, which is attached to the die holder and oscillates the die holder in a first direction; and a second drive assembly which is attached to the first drive assembly and oscillates the first drive assembly in a second direction which is substantially perpendicular to the first direction.

Another apparatus for making laminated edible products includes a support having an infeed end and a discharge end and capable of movement in a first direction, wherein said infeed end is for receiving one or more layers of a fluid material onto the support; a pivot support for supporting the discharge end of the support; means for oscillating the infeed end in a second direction substantially perpendicular to the first direction; a coaxial die assembly for depositing one or more layers of a fluid material onto the infeed end of the support and; a die holder, for supporting the coaxial die assembly and being positioned above the infeed end of the support.

A preferred apparatus for making laminated edible products includes a support having an infeed end and a discharge end and capable of movement in a first direction, wherein said infeed end is for receiving one or more layers of a fluid material onto the support; a pivot support for supporting the discharge end of the support; at least one caster for supporting the infeed end of the support; a cam mechanism connected to the infeed end of the support whereby rotation of the cam mechanism oscillates the support in a second direction substantially perpendicular to the first direction; a coaxial die assembly for depositing one or more layers of a fluid material onto the infeed end of the support and; a die holder, for supporting the coaxial die assembly and being positioned above the infeed end of the support.

BRIEF DESCRIPTION OF THE DRAWINGS

Preferred features of the invention can be understood from a review of the following detailed description and drawing figures, wherein.

DETAILED DESCRIPTION OF THE PREFERRED EMBODIMENTS

The present process can be used for manufacturing a laminated edible product wherein a thin strip of at least one first fluid material encased in a layer of a second fluid material is layered on top of itself. The at least one first fluid material is preferably a lipid based continuous phase which may contain suspended matter to form a paste like consistency. The second fluid material is preferably a material having a ductile property. Ductile refers to a fluid that can be stretched and folded. The at least one first fluid material and the second fluid material are not miscible. In a preferred embodiment the process is used to manufacture a laminated candy product. Thin strips of a fatty paste or fluid (e.g., peanut butter at 170° F.) encased in a layer of liquid or plastic candy mass are produced and used as the building blocks for a laminated structure. The process of the present invention ensures a laminated structure that has a good layered structure that is more uniform in texture than products produced in a conventional manner. In addition, the process of the present invention produces a product that has greater consistency on a continuous basis and greater consistency from batch to batch. The process of the present invention also provides improved control over the thickness of the layers and thus, the process provides greater opportunity to vary the texture of the product. The process also provides greater flexibility in the ratio of fatty paste or fluid to candy mass.

According to the invention the at least one first fluid material can be a mixture of two or more first fluid materials. In another embodiment the two or more first fluid materials are not extruded as a mixture but are extruded so that each of the first fluid materials are layered on top of the other first fluid material(s) to form a multi-layered thin strip of first fluid materials encased in the second fluid material. In yet another embodiment of the invention the at least one first fluid material is more than one fluid material that is extruded to form a single layer of first fluid materials encased in the second fluid material and wherein each first fluid material is adjacent to another first fluid material.

By "fatty paste" or fluid is meant a liquid having fat as the continuous phase such that the matrix of the fluid is fat based. Examples of fatty pastes include, but are not limited to peanut butter, white chocolate, and hazel nut paste.

By "candy mass" is meant any hard candy product produced by methods known to those of ordinary skill in the art.

Figure 1:
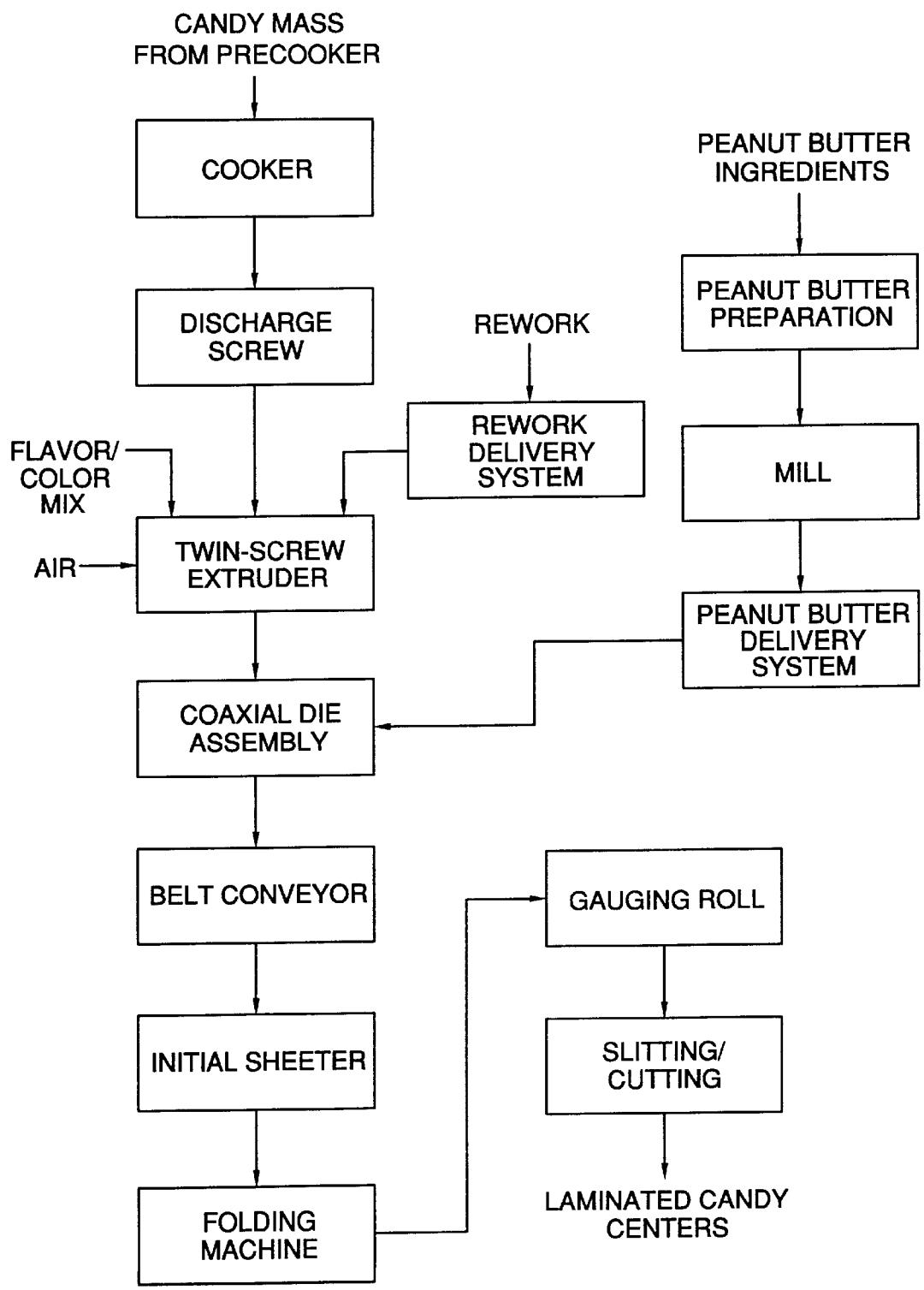
FIG. 1 is a flow chart depicting the process for making a laminated candy product according to the present invention.

The process of the present invention is described schematically in FIG. 1. According to the present invention, candy syrup is precooked and then boiled to produce a boiled candy mass. The candy syrup may include, for example, corn syrup, granulated sugar, reducing sugars, and water, optionally with flavors and/or colors. The moisture content of the candy syrup is approximately 20 to 30 percent by weight. The boiled candy mass is then flashed at atmospheric pressure followed by flashing under reduced pressure to remove moisture such that the resulting candy mass has a moisture level of about 3–5%. The resulting boiled candy mass is discharged from the cooker through a discharge screw and mixed with flavors and/or colorings and aerated in a twin screw extruder. Suitable flavors include, but are not limited to, molasses, salt and vanilla flavors. Colorings may be, for example, molasses and/or FD&C food colors. The candy mass may also be combined with rework from previous manufacturing processes.

Figure 2:
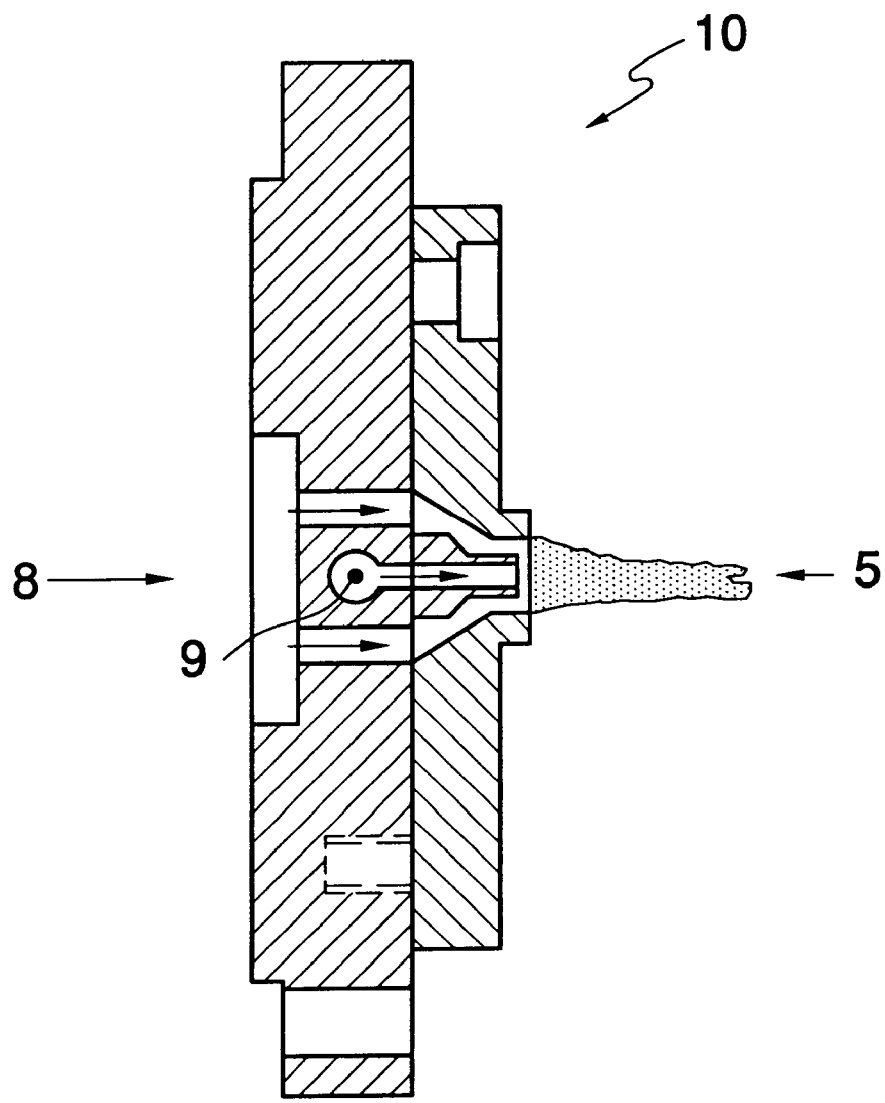
FIG. 2 is a schematic drawing of a coaxial die assembly for manufacturing center-filled strips according to the present invention.

The aerated mass and the fatty paste or fluid is then pumped into separate manifolds of a coaxial die assembly such as that depicted in FIG. 2. A thin strip 5 of fatty paste or fluid encased in a layer of aerated candy mass exits from the coaxial die. The exit port of the coaxial die is oriented such that the center-filled strip which exits the coaxial die assembly is drawn out by gravity which elongates and thins the center-filled strip. Allowing the center-filled strip to be drawn out by gravity permits the thickness of the center-filled strip to be varied. An additional advantage of drawing out the center-filled strip is that the candy mass cools while the strip is elongating. As a result of the fatty paste or fluid cooling, the viscosity of the candy layer increases and the candy layer does not flow away from the fatty paste, resulting in a layered mass that is more stable and easier to handle. External cooling may also be applied to further cool the center-filled strip. The resulting center-filled strip is collected on a conveyor belt.

The one or more fatty pastes or fluids can also be extruded from the coaxial die assembly to form a multi-layered fatty paste or fluid encased in the aerated candy mass. In addition, more than one fatty pastes or fluids can be extruded from the coaxial die assembly to form a single layer of fatty paste or fluid encased in the aerated candy mass and wherein the fatty pastes or fluids are adjacent to each other. One of ordinary skill in the art would readily know how to modify the coaxial die assembly so as to produce multi-layered fatty pastes or fluids or to produce a single layer of fatty pastes or fluids wherein the fatty pastes or fluids are adjacent to each other.

As the center-filled strip is collected on the conveyor belt it is layered on top of itself. The center-filled strip can be layered on top of itself by collecting the center-filled strip on a belt which oscillates back and forth under the exit port of the coaxial die. In another embodiment of the invention the center-filled strip may be layered on top of itself by slinging the strip. The slinging can be achieved by oscillating the coaxial die assembly back and forth. Thus, the center-filled strip is layered on top of itself by oscillating the die assembly over a slower moving conveyor belt. In this embodiment the twin screw extruder is attached to the coaxial die with a flexible hose to permit the die to oscillate. In yet another embodiment of the invention both the die and the belt are oscillated. The die is oscillated in one direction, for example the X direction, and the belt is oscillated in a direction perpendicular to the direction of oscillation of the coaxial die, i.e., the Y direction. This allows the center-filled strips to be layered over the entire width of the belt. The resulting stack can then be further processed. For example, the stack can be folded on top of itself or thinned down by rolling to form thicker or thinner products.

According to the present invention, the thickness of the center-filled strips can be varied by varying the distance between the coaxial die assembly and the conveyor belt and potentially by the slinging action of the oscillating die. The thickness of the strips may be from about 1/100 inch to 1/8 inch. Preferably, the thickness of the strips is from about 1/10 inch to 1/25 inch. In addition, the thickness of the resulting stack (i.e., the number of layers of center-filled strips) can also be varied. The number of layers in the stack may vary from about 1 layer to 500 layers. Preferably the number of layers in the stack varies from about 10 layers to 50 layers. The thickness of the stack may vary from about 1/100 inch to 4 inches. Preferably the thickness of the stack is from about 0.375 inches to 1 inch. Thus, the process permits both the number of layers and the thickness of the layers to easily be varied. Since the texture of the layered structure is determined by the number of layers and the thickness of the layers, the method provides improved control over the texture of the final candy product.

Figure 4:
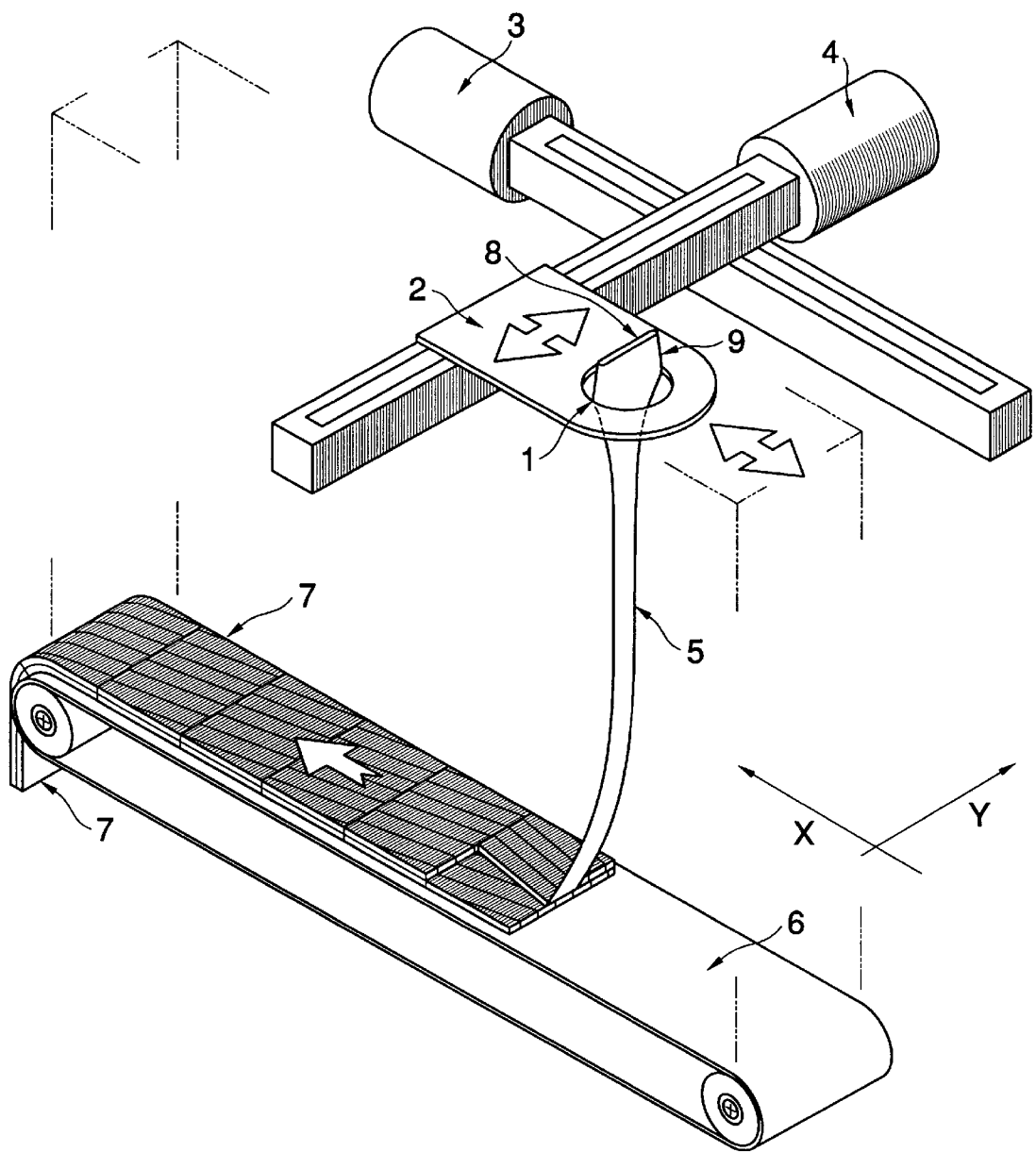
FIG. 4 is a schematic drawing of an apparatus having an oscillating coaxial die assembly for manufacturing a laminated candy product according to the present invention.

FIG. 4 shows an apparatus, having an oscillating coaxial die assembly, for making laminated candy products according to the present invention. The apparatus includes a coaxial die assembly such as that depicted in FIG. 2. A fluid material such as an aerated candy mass 8 is delivered to the coaxial die assembly 10 from an extruder via a flexible hose or other suitable conduit. A second fluid material 9 such as a fatty paste or fluid, for example, peanut butter is also delivered to the coaxial die assembly from a supply system via a flexible hose or other suitable conduit. The coaxial die is supported by a die holder 2 in the die area 1. The coaxial die deposits an extrudate 5 which is a thin layer of a fluid first material interleaved between thin layers of a second fluid material on a conveyor belt 6 positioned below the coaxial die assembly. The conveyor belt moves in a given direction, for example the X direction. The die holder is connected to a first drive assembly 4 so that the die can be oscillated in a second direction which is perpendicular to the direction the conveyor belt 6 is moving, i.e., the Y direction. The first drive assembly 4 is connected to a second drive assembly 3 so that drive assembly 4 and thus the die holder can be oscillated in the first direction which is the same as the direction of movement of the conveyor belt 6, i.e., the X direction. The movement in the X-direction tends to sling the coaxial candy strip 5 such that the coaxial candy strip 5 is folded upon itself on the collecting belt 6. The oscillation of the die assembly in the Y direction allows the strips to be loaded across the width of the collecting belt 6. By varying the speed of the collecting belt 6, the thickness of the layered candy mass 7 on the collecting belt 6 can be varied. The conveyor belt 6 moves the candy mass on to the next operation such as a folding and/or rolling operation.

Figure 5:
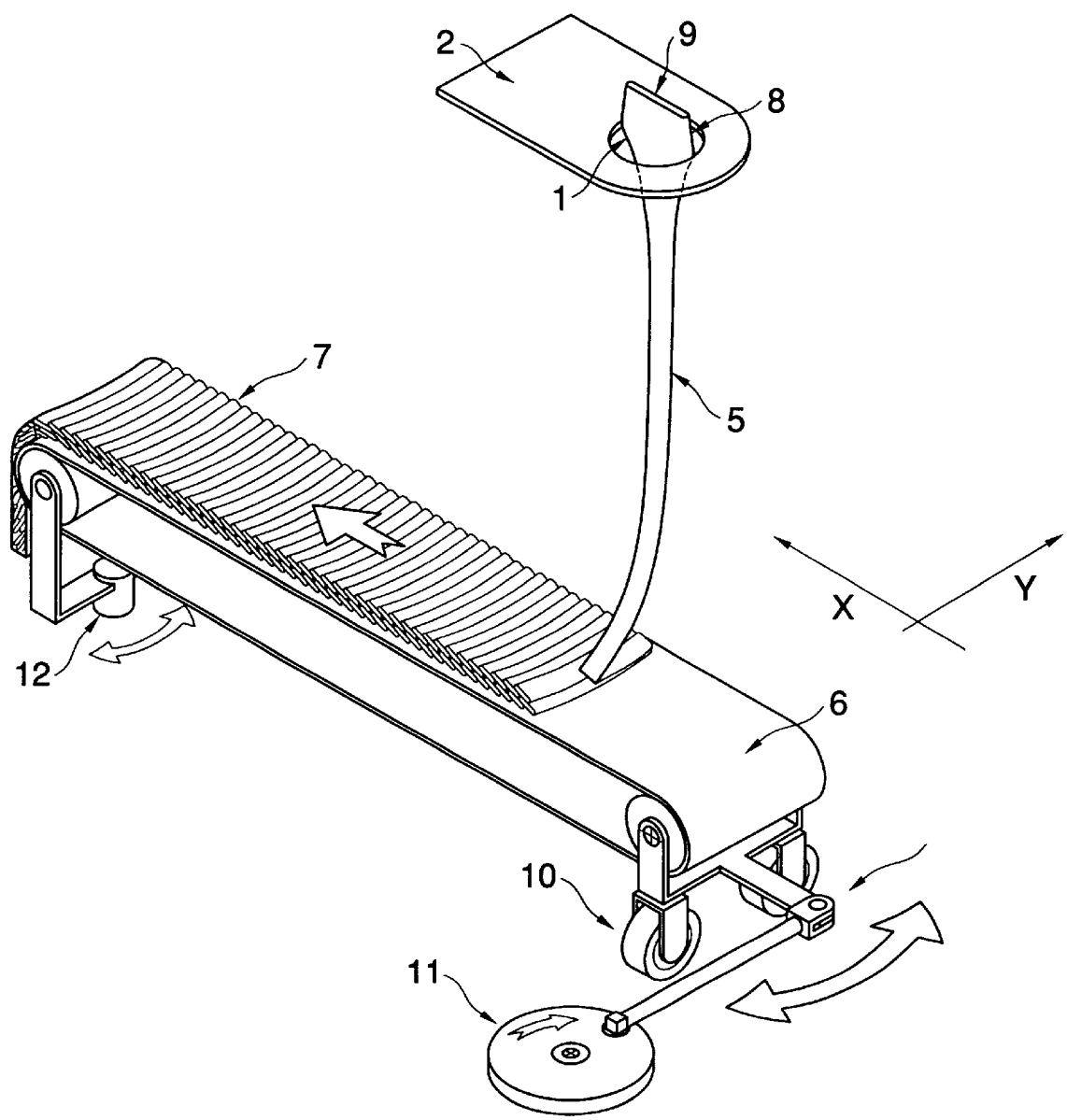
FIG. 5 is a schematic drawing of an apparatus having an oscillating support for manufacturing a laminated candy product according to the present invention.

FIG. 5 shows an apparatus, having an oscillating support, for making laminated candy products according to the present invention. A fluid material such as an aerated candy mass 8 is delivered to the coaxial die assembly 10 from an extruder. A second fluid material 9 such as a fatty paste or fluid, for example, peanut butter is also delivered to the coaxial die assembly 10 from a supply system via a suitable conduit. The coaxial die is supported by a die holder 2 in the die area 1. The coaxial die allows for the formation of a coaxial strip 5 consisting of a thin layer of a first fluid material interleaved between thin layers of a second fluid material. The coaxial strip 5 is drawn out by gravity before it drops onto the conveyor belt 6. The conveyor belt 6 moves in a given direction, for example the X direction. The coaxial strip 5 is deposited on the infeed end of the conveyor belt 6. The infeed end of the conveyor belt is oscillated from side to side in a direction perpendicular to the movement of the conveyor belt 6, i.e., the Y direction, to facilitate the layering of the coaxial strip 5 upon itself and to load the width of the belt as desired. The oscillation is achieved by supporting the infeed end of the conveyor belt with casters 10 and rotating a cam mechanism 11 which is attached to the infeed end of the support. The discharge end of the conveyor belt 6 has a pivoting support 12. By varying the speed of the collecting belt 6, the thickness of the layered candy mass 7 on the collecting belt 6 can be varied. The conveyor belt 6 moves the candy mass on to the next operation such as a folding and/or rolling operation. A variety of other means for oscillating the support are possible. These means are well known to those of ordinary skill in the art and need not be discussed here.

EXAMPLES

The invention is further defined by reference to the following examples describing in detail the methods of the present invention. The examples are representative, and should not be construed to limit the scope of the invention in any way.

Example 1
Extrusion Process for Laminated Candy Products

Figure 3:
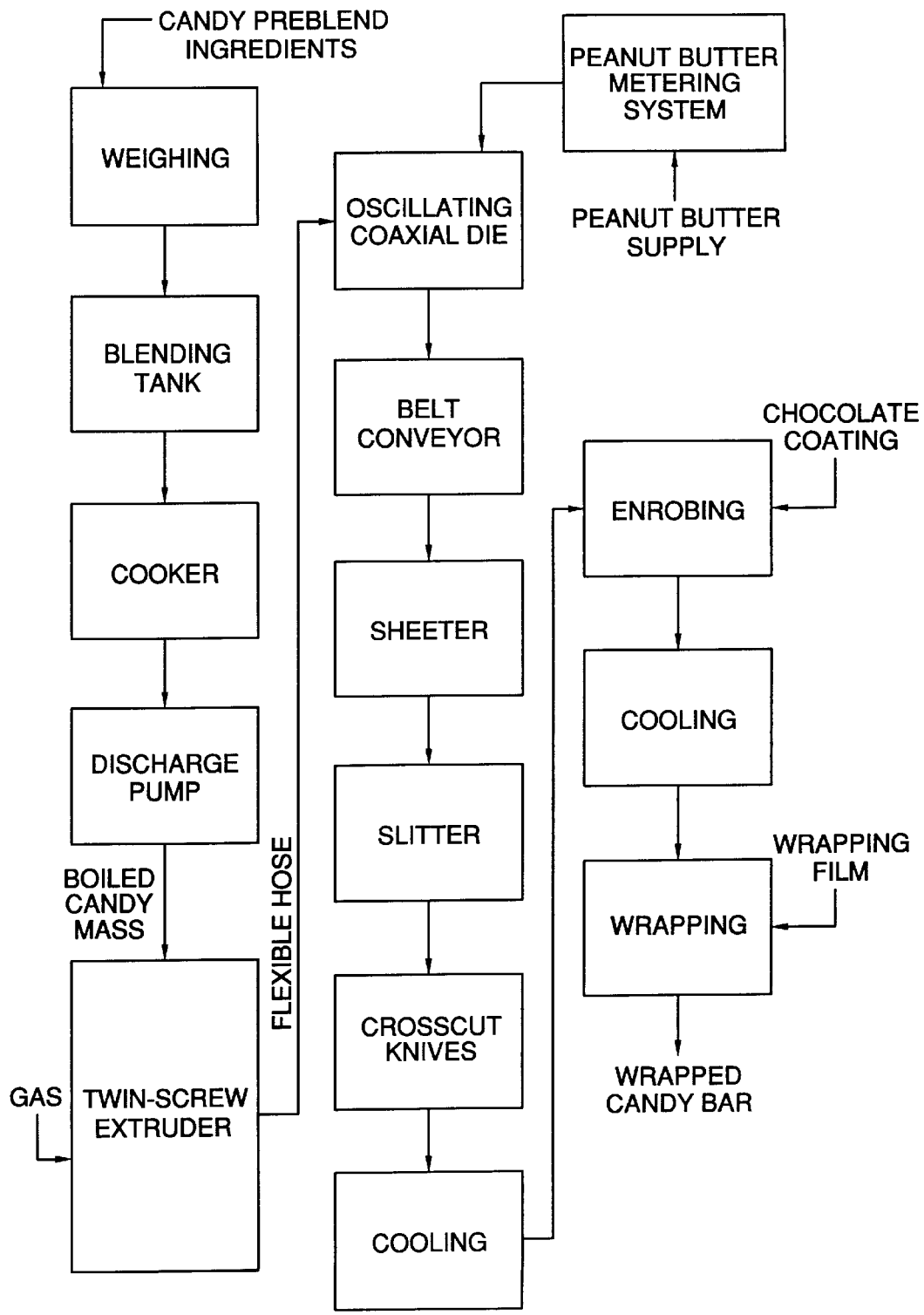
FIG. 3 is a flow chart depicting the process for making a laminated candy product according to the present invention as described in Example 1.

In this example, a twin screw extruder was used to deliver aerated candy mass to an oscillating coaxial die that discharges downward. The die allowed a thin sheet of peanut butter to be surround by a layer of aerated boiled candy mass to form a coaxial strip that was approximately 3 inches wide and 0.25 inches thick at the discharge of the die. The strips were collected on a belt conveyor that was 24 inches below the die. As the oscillating motion of the die slung the strip, the strip was drawn down such that the cross sectional area of the strip was significantly reduced at the point that it reached the belt (approx. 5 to 10 percent of the original area at the die). This layered mass was then rolled out to form a consistent laminated sheet. The sheet was subsequently cut into candy bar centers. The die was oscillated in both the X and Y directions. The X motion (parallel to the collecting belt) slung the extrudate from the die to draw it out and fold the strips on top of previously laid strips, and the Y motion allowed for loading across the width of the collecting belt. The process is described below and schematically in FIG. 3.

1. A candy preblend was prepared according to the formula in Table 1. The batch of candy preblend was prepared in a jacketed tank. The candy preblend was heated to approx. 170° F. and the batch was mixed.

2. The candy preblend was cooked to 270° F. at an infeed rate of 9.0 Lbs./min and flashed to 6 in Hg vacuum.

3. The boiled candy mass was delivered to a TSE (Wenger TX-52 Extruder, commercially available from Wenger manufacturing Inc. of Fabetha, Kans.) running at 285 RPM which aerates the mass with injected air.

4. Peanut butter at 155° F. was metered into a coaxial die at 3.2 Lbs./min.

5. The oscillating coaxial die assembly was set such that the die travels at 75 cycles per min. with a six inch travel in the X-direction; and the die travels at 12 cycles per min. with a 5 inch travel in the Y-direction.

6. The slung coaxial strips from the die were collected on a belt conveyor with the belt moving such that the strips were allowed to stack up on top of each other creating a layered mass that was approximately 1 inch thick.

7. The layered mass was then rolled out to obtain a sheet that was approximately 5/8 inch thick.

8. The sheet was then transferred to a sheeting mechanism that formed a sheet that was 3/8 inch thick.

9. Using slitting knives, the sheet was cut into strips that were approximately 1 inch wide.

10. Using crosscut knives, the strips were cut into candy bar centers that can be coated with chocolate.

TABLE 1

Candy Preblend Formula

| Ingredient | Percent |
| --- | --- |
| Corn Syrup | 58.0% |
| Granulated Sugar | 32.2% |
| Water | 8.0% |
| Flavors and Color | 1.8% |

Example 2
Extrusion Process for Laminated Candy Products

The same 3/8 inch thick sheet that was produced in step number 8 of Example 1 was used to make a spherical confectionery product have a laminated structure. The sheet was take from the sheeter and fed into drop forming rolls. The rolls were set up to produce spheres with a 1/2 inch diameter. The rolls converted the laminated sheet into spheres, and then screened out the detached webbing. These laminated centers can then be coated to make various confectionery products.

Example 3
Extrusion Process for Laminated Candy Products

In this example, the process was similar to that described in Example 1, except that the twin screw extruder was replaced. The twin screw extruder was replaced with a mixing screw for aeration of the boiled candy mass and a positive displacement pump to deliver the candy to the oscillating coaxial die assembly. The process is described below 1. From the discharge of the cooker, the boiled candy mass was fed into the mixing screw.

2. Air was injected into the mixing screw and the air was mixed into the boiled candy mass.

3. The aerated candy mass was discharged from the mixing screw, and fed into a positive displacement pump. The pump (Waukesha 15U Pump, commercially available from Waukesha Fluid Handling of Delavan, Wisc.) then delivered the aerated candy mass to the oscillating coaxial die.

The remainder of the process was similar to that which is described in Example 1.

What is claimed is:

1. A method of producing a laminated edible candy product having thin layers of at least one first fluid material interleaved between thin layers of a second fluid material comprising:

extruding from the exit port of a coaxial die a first thin strip of at least one first fluid material comprising a paste encased in a layer of a second fluid material comprising a boiled candy mass, wherein the at least one first fluid material and the second fluid material are not miscible;

cooling the first thin strip;

depositing the cooled first thin strip on a support; and directly superimposing a second cooled thin strip on the first cooled thin strip to form the product.

2. The method of claim 1, further comprising superimposing on the first and second thin strips at least one additional thin strip.

3. The method of claim 2, wherein said superimposing is accomplished by oscillating the support under the exit port of the coaxial die.

4. The method of claim 2, wherein said superimposing is accomplished by oscillating the coaxial die above the support.

5. The method of claim 4, wherein the superimposing is accomplished by oscillating the coaxial die simultaneously in a first direction and a second direction which is substantially perpendicular to the first direction.

6. The method of claim 5, wherein said support is a conveyor belt which moves in the first direction.

7. The method of claim 2, wherein the support is a conveyor belt and wherein the superimposing step is accomplished by moving the conveyor belt in a first direction and oscillating the exit port of the coaxial die above the conveyor belt in a second direction which is perpendicular to said the direction.

8. The method of claim 2, wherein the superimposing is accomplished by oscillating the exit port of the coaxial die in a first direction and the support is oscillated in a second direction, wherein the second direction is perpendicular to the first direction.

9. The method of claim 2, wherein the thickness of the thin strips is between about 1/100 inch and 1/8 inch.

10. The method of claim 2, wherein about 2 to 500 thin strips are superimposed to form the product.

11. The method of claim 2, wherein the layer of superimposed thin strips has a thickness of between about 0.01 inches to 4 inch.

12. The method of claim 2, which further comprises rolling the layer of thin strips to form the product.

13. The method of claim 2, wherein the thin strip of at least one first fluid material is a multi-layered thin strip of first fluid materials.

14. The method of claim 2, wherein the thin strip of at least one first fluid material is a single layer of more than one first fluid materials and wherein each of the first fluid materials are adjacent to each other.

15. The method of claim 2, wherein the paste is peanut butter.

16. The method of claim 1, wherein the coaxial die is part of an apparatus comprising:

a conveyor capable of movement;

a die holder, for supporting the coaxial die and being positioned above the conveyor;

a first drive assembly attached to the die holder for oscillating the die holder in a first direction; and a second drive assembly which is attached to the first drive assembly and oscillates the first drive assembly in a second direction which is substantially perpendicular to the first direction.

17. The method of claim 1, wherein the coaxial die is part of an apparatus comprising:

a conveyor having an infeed end and a discharge end and capable of movement in a first direction, wherein said infeed end is for receiving one or more layers of the cooled thin strip;

a pivot support for supporting the discharge end of the conveyor;

means for oscillating the infeed end in a second direction substantially perpendicular to the first direction;

a die holder, for supporting the coaxial die and being positioned above the infeed end of the conveyor.

18. The method of claim 1, wherein the coaxial die is part of an apparatus comprising:

a conveyor having an infeed end and a discharge end and capable of movement in a first direction, wherein said infeed end is for receiving one or more layers of the cooled thin strip;

a pivot support for supporting the discharge end of the conveyor;

at least one caster for supporting the infeed end of the conveyor;

a cam mechanism connected to the infeed end of the conveyor whereby rotation of the cam mechanism oscillates the conveyor in a second direction substantially perpendicular to the first direction; and a die holder, for supporting the coaxial die and being positioned above the infeed end of the support.

\* \* \* \* \*